United States Patent
Zimmerman Frisby et al.

(10) Patent No.: US 10,392,917 B1
(45) Date of Patent: Aug. 27, 2019

(54) METHOD AND APPARATUS FOR UTILIZATION OF WATER PRODUCED FROM SUBTERRANEAN HYDROCARBON RESERVES IN MINING OF ASSOCIATED MINERAL DEPOSITS

(71) Applicant: AMEC FOSTER WHEELER USA CORPORATION, Houston, TX (US)

(72) Inventors: Katherine N. Zimmerman Frisby, Houston, TX (US); Patti Yoast, Houston, TX (US)

(73) Assignee: AMEC FOSTER WHEELER USA CORPORATION, Houston, TX (US)

( * ) Notice: Subject to any disclaimer, the term of this patent is extended or adjusted under 35 U.S.C. 154(b) by 0 days.

(21) Appl. No.: 15/813,878

(22) Filed: Nov. 15, 2017

Related U.S. Application Data

(60) Provisional application No. 62/423,467, filed on Nov. 17, 2016.

(51) Int. Cl.
| | | |
|---|---|---|
| *E21B 43/40* | (2006.01) | |
| *E21B 43/34* | (2006.01) | |
| *E21C 45/00* | (2006.01) | |
| *E21B 43/29* | (2006.01) | |
| *C02F 1/76* | (2006.01) | |
| *C02F 1/00* | (2006.01) | |
| *C02F 1/52* | (2006.01) | |
| *C02F 1/24* | (2006.01) | |
| *C02F 103/10* | (2006.01) | |
| *C02F 101/32* | (2006.01) | |
| *C02F 101/20* | (2006.01) | |
| *C02F 101/10* | (2006.01) | |

(52) U.S. Cl.
CPC ............. *E21B 43/34* (2013.01); *C02F 1/001* (2013.01); *C02F 1/24* (2013.01); *C02F 1/5236* (2013.01); *C02F 1/76* (2013.01); *E21B 43/29* (2013.01); *E21C 45/00* (2013.01); *C02F 2101/101* (2013.01); *C02F 2101/203* (2013.01); *C02F 2101/206* (2013.01); *C02F 2101/32* (2013.01); *C02F 2103/10* (2013.01); *C02F 2303/04* (2013.01); *E21B 43/40* (2013.01)

(58) Field of Classification Search
CPC .................................................... E21B 43/40
See application file for complete search history.

(56) References Cited

U.S. PATENT DOCUMENTS

| | | | | |
|---|---|---|---|---|
| 2010/0135880 A1* | 6/2010 | Graham | ............. | B01D 53/1456 |
| | | | | 423/220 |
| 2017/0088447 A1* | 3/2017 | Flatley | .................. | C02F 1/5236 |

OTHER PUBLICATIONS

"Water Quality in Mining" article, Miningfacts.org, 3 pages, Feb. 2013.*

(Continued)

*Primary Examiner* — Sunil Singh
(74) *Attorney, Agent, or Firm* — Winstead PC

(57) ABSTRACT

Identifying geographical uses, other than disposal for produced water that is recovered from a well and establishing methods and systems for recovering and handling this water. The produced water is treated so as to render the produced water suitable for solution mining. The produced water is transported to a solution mining site and the produced water is utilized at the solution mining site.

7 Claims, 5 Drawing Sheets

(56) References Cited

OTHER PUBLICATIONS 2 pages, verifying "Water Quality in Miining" article's date, Apr. 1, 2018.*
Penn State College of Agricultural Sciences, "Marcellus Shale Wastewater Issues in Pennsylvania," 2016 [8 pages].
Koerth-Baker, Maggie, "Potash Mining on the Colorado River," Nov. 10, 2011 [2 pages].

* cited by examiner

METHOD AND APPARATUS FOR UTILIZATION OF WATER PRODUCED FROM SUBTERRANEAN HYDROCARBON RESERVES IN MINING OF ASSOCIATED MINERAL DEPOSITS

CROSS-REFERENCE TO RELATED APPLICATIONS

This patent application claims priority to, and incorporates by reference the entire disclosure of, U.S. Provisional Patent Application No. 62/423,467, filed on Nov. 17, 2016.

BACKGROUND

Technical Field

The present disclosure relates generally to the collection, treatment, and utilization of water produced from subterranean hydrocarbon reserves and more particularly, but not by way of limitation, to the collection, treatment, and utilization of water produced from subterranean hydrocarbon reserves in the mining of mineral deposits demonstrated to be correlated with the subterranean hydrocarbon reserves.

History of the Related Art

Produced water is a byproduct of hydrocarbon production and is typically contained in large underground formations. During recovery of hydrocarbons, the properties of produced water vary depending on the geographic location of the well and the geological formation containing the produced water. Furthermore, experience has shown that the properties of the produced water can vary over the production life of the well. Because of this, produced water often represents a significant environmental consideration that must be effectively controlled and managed in order to operate a production facility in a safe and environmentally-friendly manner.

Produced water is far and away the largest byproduct (by volume) associated with hydrocarbon production. It is estimated that approximately 21 billion barrels of produced water are generated from approximately 900,000 hydrocarbon wells each year. The large volume of produced water causes management of produced water to be a significant cost in a hydrocarbon exploration operation. Such costs impact the overall profitability of a particular hydrocarbon production operation. These costs include construction or acquisition of disposal facilities, the costs of operating such facilities, and the costs associated with collection, handling, and transportation of the produced water.

With the costs of managing produced water in mind, measures to identify solutions for, as well as methods and systems to, efficiently utilize and/or re-claim produced water in an environmentally and cost-effective manner could represent a significant cost savings to operators of hydrocarbon production facilities.

SUMMARY

The present disclosure relates generally to methods and systems for the utilization of water produced from subterranean hydrocarbon reserves. More particularly, but not by way of limitation, the present disclosure relates to the utilization of water produced from subterranean hydrocarbon reserves in the mining of mineral deposits correlated with the subterranean hydrocarbon reserves. In one aspect, the present disclosure relates to a method for utilization of produced water. The method includes recovering produced water from a well and treating the produced water in such as way so as to render the produced water suitable for solution mining. The produced water is transported to a solution mining site and the produced water is utilized at the solution mining site.

In another aspect, the present disclosure relates to a produced-water utilization system. The produced-water utilization system includes a water-gathering system fluidly coupled to at least one well pad for recovery of produced water. A water-treating system is fluidly coupled to the water-gathering system. A water-distribution system is fluidly coupled to the water-treating system. The water-distribution system transports produced and treated water to a solution mining site. In a further embodiment, the solution mining site is configured for the mining of potash.

BRIEF DESCRIPTION OF THE DRAWINGS

For a more complete understanding of the present disclosure and for further objects and advantages thereof, reference may now be had to the following description taken in conjunction with the accompanying drawings in which.

DETAILED DESCRIPTION

Various embodiments will now be described more fully with reference to the accompanying drawings. The disclosure may, however, be embodied in many different forms and should not be construed as limited to the embodiments set forth herein.

Figure 1A:
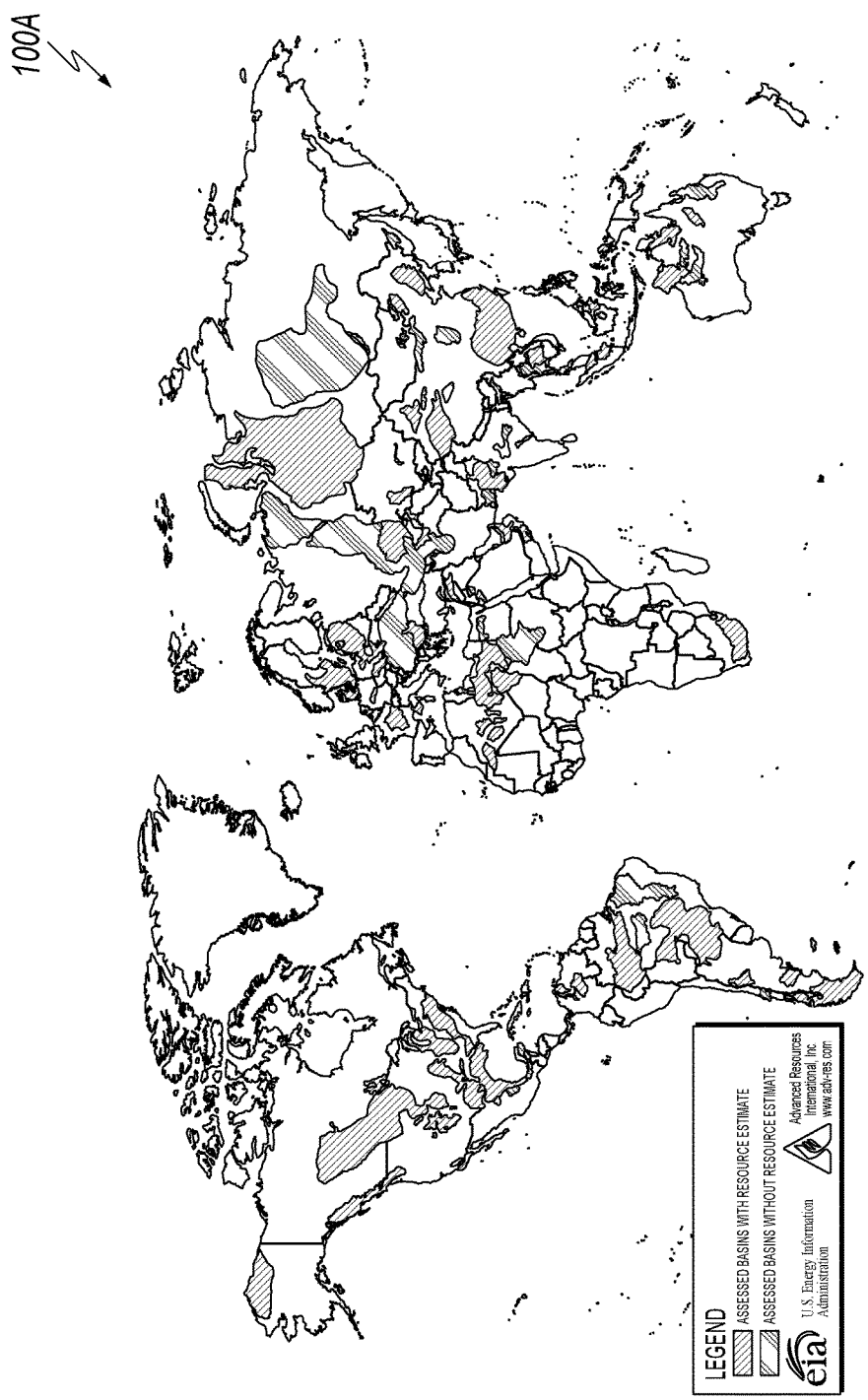
FIG. 1A is a diagram illustrating locations of global subterranean hydrocarbon reserves.
Figure 1B:
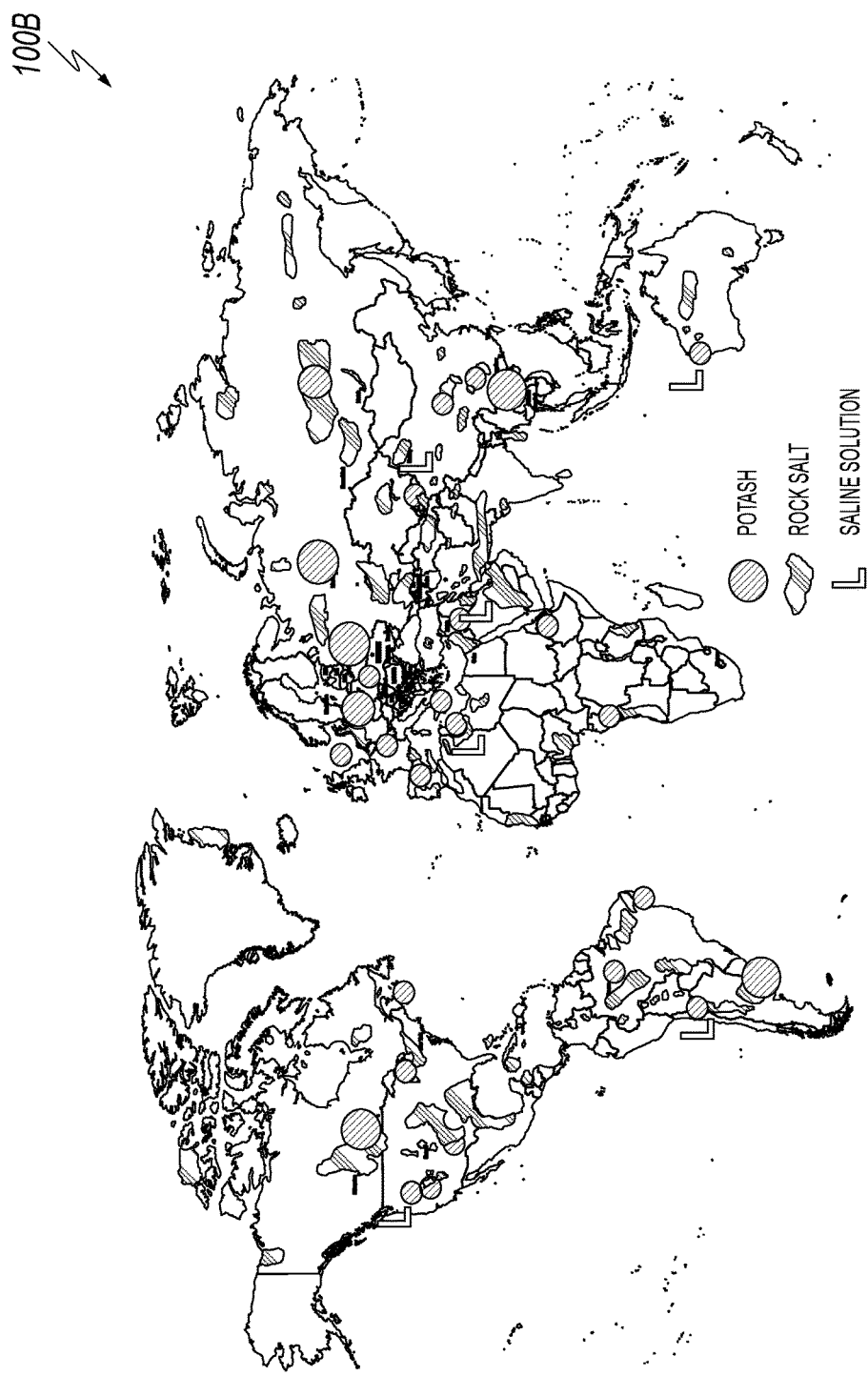
FIG. 1B is a diagram illustrating locations of global potash reserves.

FIG. 1A is a diagram illustrating locations of global subterranean hydrocarbon reserves. FIG. 1B is a diagram illustrating locations of global mineral reserves. Referring to FIGS. 1A and 1B collectively, it has been recognized by the present inventors that there is a strong correlation between the presence of subterranean hydrocarbon reserves and the presence of various mineral reserves, such as, for example, potassium chloride, which is known by those skilled in the art as "potash." As such, the present inventors have recognized that efficiencies can be realized by co-locating potash mines near subterranean hydrocarbon recovery operations and utilizing water produced during the recovery of hydrocarbons such as, for example, oil and gas, in the mining and recovery of minerals such as, for example, potash.

Figure 2:
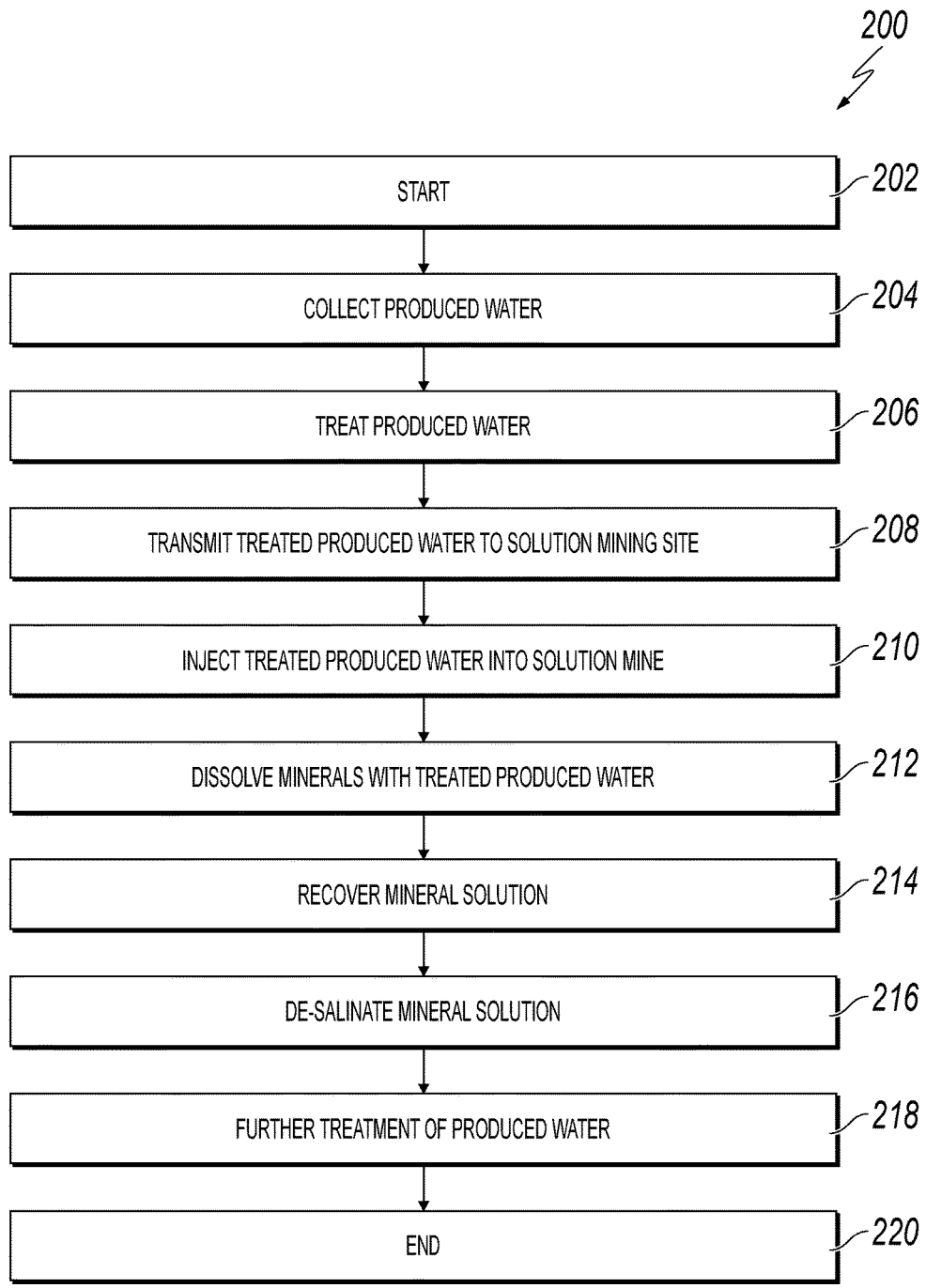
FIG. 2 is a flow diagram of a process for utilization of produced water in accordance with an exemplary embodiment.

FIG. 2 is a flow diagram of a process 200 for utilization of produced water. The process 200 begins at step 202. At step 204, produced water is collected from at least one well pad. In embodiments utilizing a plurality of well pads, the well pads are arranged in a parallel configuration so that flow interruption from one pad, other than volume, does not interrupt overall flow. Thus, in the event that one or more well pads become shut in, recovery of produced water from the remaining well pads will continue at a lower volume. In a typical embodiment, produced water can be generated at a rate of approximately 3,000 barrels per day to approximately 60,000 barrels per day depending on location. Wells will typically shut in, for example, if there is a down-stream high pressure event, a control valve failure, or a downstream network problem that impacts a wells ability to export. In a typical embodiment, a water-gathering system is a low-pressure system thereby allowing newer, higher-pressure well pads to flow directly into the gathering system. Older, lower-pressure wells could also access the gathering system via a pump At step 206, the produced water is treated in order to render the produced water suitable for solution mining of, for example, potash. In various embodiments, treatment of the produced water includes, for example, chemical treatment, filtration, and ion treatment as dictated by the specific chemistry of the produced water. The chemical composition of the produced water varies considerably from well to well; however, there are certain components of produced water that would need to be removed in order for the produced water to be utilized in potash production. In various embodiments, such components include, for example, oil and grease, barium, strontium, suspended solids, bacteria, sulfide, iron, manganese, and boron. In a typical embodiment, combinations of chemical oxidation, chemical precipitation, solid/liquid separation, and filtration can be used to remove the unwanted components. For example, oxidation can be used to break oil and grease emulsions, oxidize bacteria, and remove iron, sulfide, manganese, and other metals. An ion exchange resin can be used to remove boron. Because of variations in the chemistry of the produced water, multiple methods of water treatment are typically utilized to address a wide range of chemical compositions. In a typical embodiment, the treatment units are modular, truckable units so as to enable ease of movement and scalability of design. Power is supplied to supplied to the treatment units via a pre-existing electrical grid. Alternatively, generators could be used in locations lacking the necessary infrastructure.

Still referring to FIG. 2, at step 208, the treated produced water is transmitted to a solution mining site for minerals such as, for example, potash. In a typical embodiment, transmission of the treated produced water is accomplished via, for example, pipes or manual transportation. By co-locating hydrocarbon recovery operations with solution mining operations, the time and expense involved with transporting the produced water can be significantly reduced. In various embodiments, piping used in transmission may include materials design to absorb solar radiation thereby increasing a temperature of the produced water therein. At step 210, the treated produced water is injected into a subterranean mining operation. At step 212, the treated produced water dissolves minerals such as, for example, potash that are present in the solution mining operation thereby creating a mineral solution. At step 214, the mineral solution is brought to a surface of the solution mining operation. At step 216, the mineral solution is treated in an evaporation process. In a typical embodiment the evaporation process removes minerals such as, for example, potash that are in solution in the treated produced water. Thus, the evaporation process separates the treated produced water from the minerals and facilitates recovery of the minerals. At step 218, the treated produced water may undergo further treatment as dictated by specific design and application requirements and re-used for further solution mining. The process ends at step 220.

Figure 3:
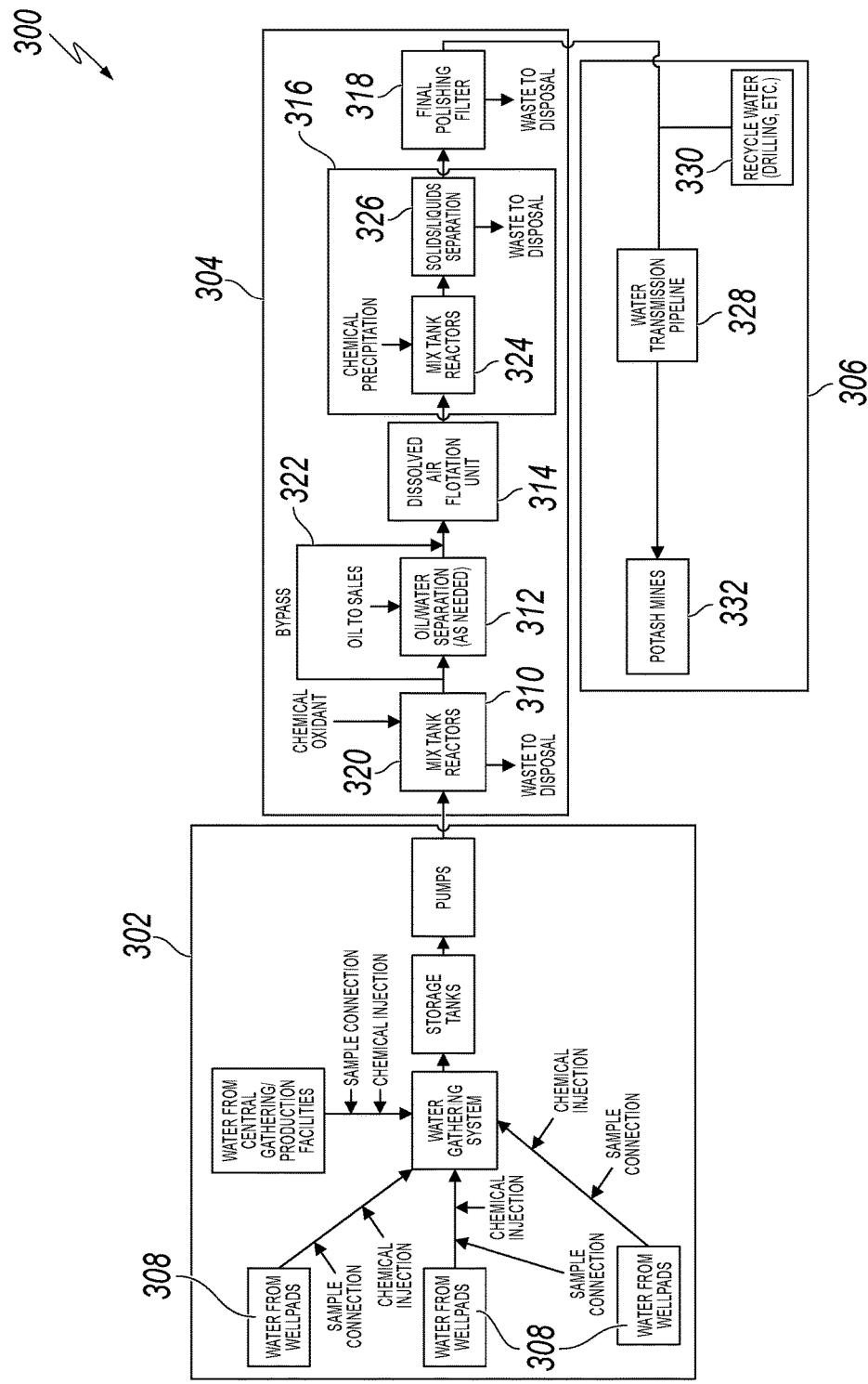
FIG. 3 is a schematic diagram of a produced-water utilization system in accordance with an exemplary embodiment.

FIG. 3 is a schematic diagram of a produced-water utilization system 300. The produced-water utilization system 300 includes a water-gathering system 302, a water-treatment system 304, and a water-distribution system 306. The water-gathering system 302 collects produced water from at least one well pad 308. In a typical embodiment, the produced water is transmitted from the well pad 308 to the water-gathering system 302 via a pipe. In various embodiments, the produced water may be chemically treated before entering the water-gathering system depending on the precise chemistry of the produced water and the compatibility of the produced water with other system water. The produced water is chemically treated in the water-treatment system 304. In a typical embodiment, the water-treatment system 304 is located near the water-gathering system 302. Such an arrangement facilitates rapid to near-immediate treatment of the produced water for calcium sulfate and the like, thereby preventing scale formation and other problems often associated with certain chemistries of the produced water. For example, scale formation can lead to equipment damage and, in the worst case, lead to the blockage of pipelines, pump damage, loss of tank volume, etc. As noted above, the chemical composition of the produced water varies considerably from well to well. Thus, the water-treatment system 304 includes various combinations of chemical oxidation, chemical precipitation, solid/liquid separation, and filtration that can be used to remove the unwanted components.

Still referring to FIG. 3, in the embodiment shown, the water-treatment system 304 includes an oxidation facility 310, an oil/water separation facility 312, a dissolved air floatation unit 314, a chemical precipitation facility 316, and a final polishing filter 318. In a typical embodiment, the oxidation facility includes a first set of mix-tank reactors 320. During operation, a chemical oxidant is added to the first set of mix-tank reactors 320. In a typical embodiment, the chemical oxidant may include, for example, chlorine dioxide or other oxidants as dictated by design requirements. The chemical oxidant breaks oil and grease emulsions, oxidize bacteria, and remove iron, sulfide, manganese, and other metals.

Still referring to FIG. 3, from the oxidation facility 310, the produced water is transported to the oil/water separation facility 312 if removal of oil or other petroleum products is required based on the chemistry of the produced water or if the oil can be recovered and subsequently sold. If removal of oil or other petroleum products from the produced water is not necessary or desired, the produced water may bypass the oil/water separation facility 312 via the bypass path 322. During operation, oil and other hydrocarbons are separated from the produced water in the oil/water separation facility. In a typical embodiment, separation of hydrocarbons is via gravity separation, hydrocyclones, and/or floatation cells. In various embodiments, internals can also be utilized on separators to improve recovery of oil. In various other embodiments, coalescers could be utilized to promote the cohesion of oil molecules to separate them form water. From the oil/water separation facility 312, the produced water travels to the dissolved air flotation unit 314. In the dissolved air flotation unit, dissolved air is saturated into a portion of the produced water in a contactor. The air-saturated water is injected into a flotation tank mixing with the remaining produced water. The dissolved air breaks out of solution in small bubbles that contact the oil droplets in the water and bring them to the surface of the produced water in a froth.

Still referring to FIG. 3, from the dissolved air flotation unit 314, the produced water travels to the chemical precipitation facility 316. The chemical precipitation facility 316 includes a second set of mix-tank reactors 324 and a solid/liquid separation unit 326. During operation, a chemical additive is introduced to the produced water in the second set of mix-tank reactors. In a typical embodiment, the chemical additive may include, for example, soda ash, lime, sodium sulfate, calcium hydroxide, or other chemical additives as dictated by design requirements. The chemical additive reacts with certain chemical components present in the produced water and causes the certain chemical components to form solid precipitants. After addition of the chemical additive, the produced water travels to the solid/liquid separation unit 326. During operation, the solid/liquid separation unit 326 removes the solid precipitants from the produced water thereby removing the certain chemical components. In various embodiments, the solid precipitants are removed from the produced water via, for example, filtration; however, in other embodiments, the solid precipitants are removed from the produced water via gravity separation, centrifuge, or other appropriate system.

Still referring to FIG. 3, after the chemical precipitation facility 316, the produced water moves to the final polishing filter 318. In the final polishing filter 318, any remaining chemical impurities that would render the produced water being unsuitable for use in solution mining are removed. In various embodiments, the remaining chemical impurities are removed from the produced water via, for example, filtration.

Still referring to FIG. 3, after the final polishing filter 318, the treated produced water enters the water-distribution system 306. In a typical embodiment, the water-distribution system 306 includes a water-transmission pipeline 328. Additionally, the water-distribution system 318 includes a water-recycling line 330. In a typical embodiment, the water-recycling line 330 allows the treated produced water to be recycled and used in further hydrocarbon recovery from subterranean hydrocarbon reserves. The water-transmission pipeline 328 transports the treated produced water to a mineral reserve such as, for example, a potash mine 332. As noted above, by co-locating hydrocarbon recovery operations with solution mining operations, the time and expense involved with transporting the produced water can be significantly reduced.

Figure 4:
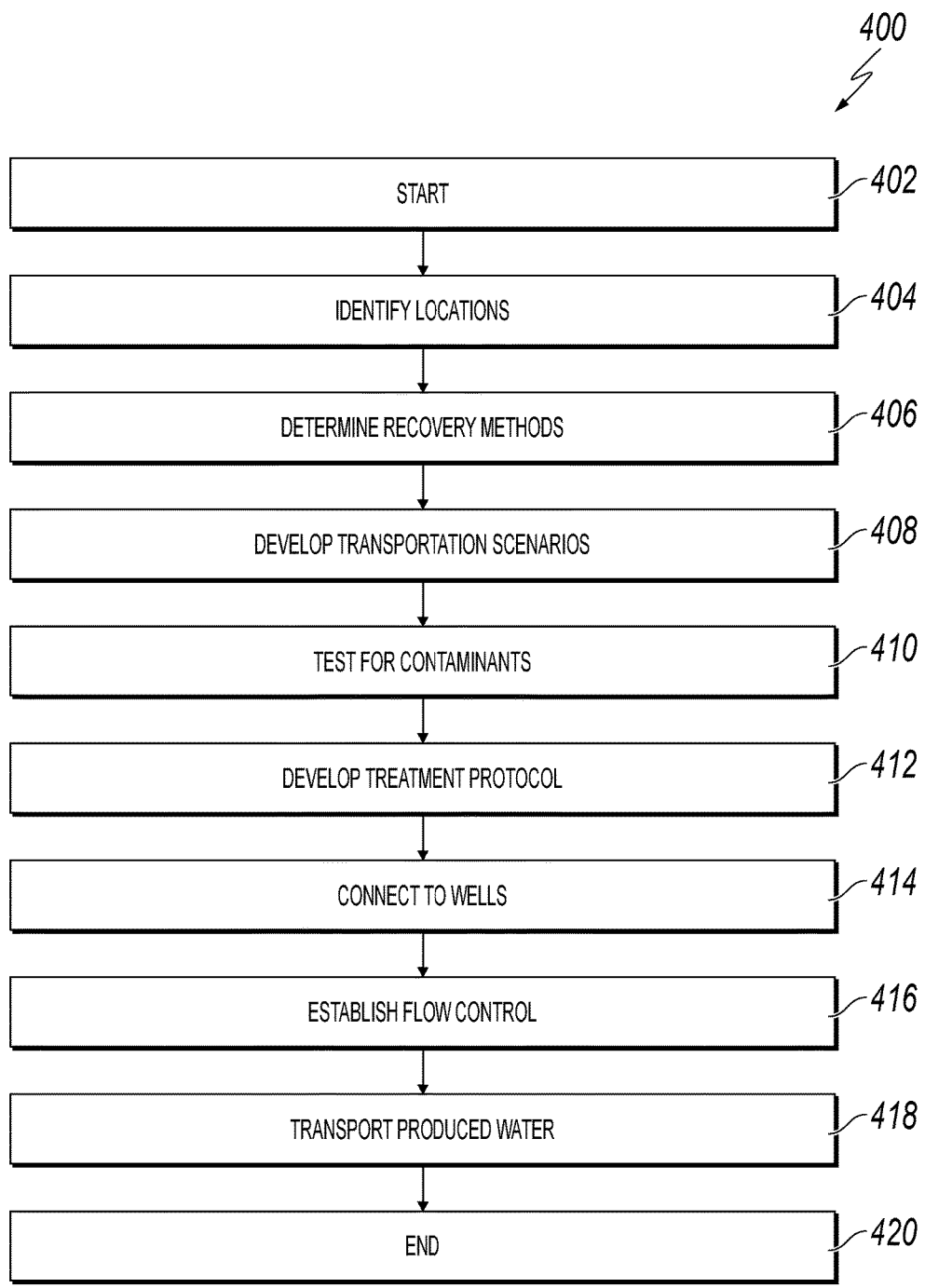
FIG. 4 is a flow diagram illustrating a process for collection, treatment, and utilization of produced water.

FIG. 4 is a flow diagram illustrating a process 400 for collection, treatment, and utilization of produced water. The process 400 begins at step 402. At step 404, possible locations for the recovery of produced water are identified. These possible locations can be identified according to one or more of, for example, number of wells, volume of water produced, and proximity to mineral reserves. At step 406, methods for recovery of the produced water from a hydrocarbon well are determined. At step 408, transportation scenarios are developed for transporting the produced water from a hydrocarbon production facility to a mineral production facility. These transportation scenarios may include one or more of, for example, pipelines and vehicle transportation as dictated by design requirements, water volume, and geography of the area. At step 410, the produced water is tested for contaminants. At step 412, a treatment protocol is developed for the produced water. At step 414, the hydrocarbon wells are connected to a water-gathering system. At step 416, flow of produced water is established between the hydrocarbon wells and the water-gathering system. At step 418, the produced water is transported to the mineral reserves. The process 400 ends at step 420.

Although various embodiments of the method and system of the present disclosure have been illustrated in the accompanying Drawings and described in the foregoing Specification, it will be understood that the disclosure is not limited to the embodiments disclosed, but is capable of numerous rearrangements, modifications, and substitutions without departing from the spirit and scope of the disclosure as set forth herein. It is intended that the Specification and examples be considered as illustrative only.

What is claimed is:

1. A method for utilization of produced water, the method comprising:
   recovering, via a water-gathering system produced water from a well, the water-gathering system operating at a pressure lower than a pressure of the well;
   treating the produced water, via a plurality of modular treatment units, so as to render the treated produced water suitable for solution mining, the treating comprising:
      adding, in a modular oxidation facility, a chemical oxidant to the produced water to break down hydrocarbon emulsions present in the produced water;
      separating, in a modular oil/water separation facility, hydrocarbons from the produced water;
      saturating, in a modular dissolved air floatation unit, dissolved air into the produced water;
      precipitating, in a modular chemical precipitation facility, chemical components from the produced water via a chemical additive; and
      removing chemical impurities in a modular polishing filter;
   transporting the treated produced water to a solution mining site; and
   utilizing the treated produced water at the solution mining site.

2. The method of claim 1, wherein the well is a subterranean hydrocarbon reserve.

3. The method of claim 1, wherein the solution mining site is a potash mine.

4. The method of claim 1, wherein the utilizing comprises:
   injecting the treated produced water into the solution mining site;
   dissolving minerals present in the solution mining site with the treated produced water to create a mineral solution; and
   recovering the dissolved minerals from the mineral solution.

5. The method of claim 1, wherein the treating comprises filtration.

6. A produced-water utilization system, comprising:
   a water-gathering system fluidly coupled to at least one well pad for recovery of produced water, the water-gathering system operating at a pressure lower than a pressure of the well;
   a water-treating system fluidly coupled to the water-gathering system, the water-treating system comprising a plurality of modular treatment units, the plurality of modular treatment units comprising:
      a modular oxidation facility fluidly coupled to the water-gathering system, that adds a chemical oxidant to the produced water to break down hydrocarbon emulsions present in the produced water;
      a modular oil/water separation facility, fluidly coupled to the oxidation facility, that separates hydrocarbons from the produced water;
      a modular dissolved air floatation unit, fluidly coupled to the oil/water separation facility, that introduces dissolved air into the produced water;
      a modular chemical precipitation facility, fluidly coupled to the dissolved air floatation unit, that precipitates chemical components from the produced water via a chemical additive; and a modular polishing filter that removes chemical impurities from the produced water; and a water-distribution system fluidly coupled to the water-treating system; and wherein the water-distribution system transports treated produced water to a solution mining site.

7. The produced-water utilization system of claim 6, wherein the water-gathering system is fluidly coupled to a plurality of wells in parallel.

* * * * *